(12) United States Patent
Kawanaka et al.

(10) Patent No.: US 12,036,609 B2
(45) Date of Patent: Jul. 16, 2024

(54) ADDITIVE MANUFACTURING CONDITION SEARCH APPARATUS, ADDITIVE MANUFACTURING CONDITION SEARCH METHOD, AND REFERENCE SAMPLE

(71) Applicant: Hitachi, Ltd., Tokyo (JP)

(72) Inventors: Hirotsugu Kawanaka, Tokyo (JP); Hyakka Nakada, Tokyo (JP); Noboru Saitou, Tokyo (JP); Shinji Matsushita, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 107 days.

(21) Appl. No.: 17/643,890

(22) Filed: Dec. 13, 2021

(65) Prior Publication Data

US 2022/0203455 A1   Jun. 30, 2022

(30) Foreign Application Priority Data

Dec. 25, 2020  (JP) ................................ 2020-216500

(51) Int. Cl.
*B22F 10/80* (2021.01)
*B33Y 50/00* (2015.01)
*G05B 19/4099* (2006.01)

(52) U.S. Cl.
CPC .............. *B22F 10/80* (2021.01); *B33Y 50/00* (2014.12); *G05B 19/4099* (2013.01); *G05B 2219/49023* (2013.01)

(58) Field of Classification Search
CPC ...... B22F 10/80; B22F 2999/00; B22F 10/85; B22F 10/28; B33Y 50/00; B33Y 10/00; G05B 19/4099; G05B 2219/49023; G01N 2203/0298; B29C 64/153; B29C 64/393; G06N 20/10
(Continued)

(56) References Cited

U.S. PATENT DOCUMENTS 10,473,552 B1 * 11/2019 Leathe ................... G01N 27/20
2010/0174392 A1 * 7/2010 Fink ........................ B22F 10/80
700/212
(Continued)

FOREIGN PATENT DOCUMENTS

CN   105571629 A   * 5/2016
CN   108839338 A   * 11/2018   ........... B29C 64/118
(Continued)

OTHER PUBLICATIONS

Extended European Search Report issued in European Application No. 21214233.5 dated May 25, 2022 (13 pages).
(Continued)

*Primary Examiner* — Thomas C Lee
*Assistant Examiner* — Michael Tang
(74) *Attorney, Agent, or Firm* — Crowell & Moring LLP

(57) ABSTRACT

A search apparatus includes a processor and a memory. The processor receives a molding result of a reference sample manufactured by the additive manufacturing apparatus. The processor calculates predicted values from a predictive model. The processor determines whether the evaluation target values are achieved by the measured values. The reference sample has at least three smooth surfaces and a surface having aggregated punched holes formed by straight lines and curved lines that are involved in three types of regions to be set as the conditions.

7 Claims, 12 Drawing Sheets

(58) Field of Classification Search
USPC .................. 700/98, 104, 118, 212; 264/497
See application file for complete search history.

(56) References Cited

U.S. PATENT DOCUMENTS

| | | |
|---|---|---|
| 2017/0270434 A1 | 9/2017 | Takigawa et al. |
| 2020/0030880 A1 | 1/2020 | Nagahama et al. |
| 2020/0111269 A1 | 4/2020 | Danis et al. |
| 2020/0298499 A1 | 9/2020 | Gupta et al. |
| 2021/0026332 A1 | 1/2021 | Inoue |
| 2021/0299754 A1 | 9/2021 | Aoyagi et al. |

FOREIGN PATENT DOCUMENTS

| | | |
|---|---|---|
| CN | 111688192 A | 9/2020 |
| EP | 2 277 687 A1 | 1/2011 |
| JP | 2017-164801 A | 9/2017 |
| JP | 2020-15944 A | 1/2020 |
| WO | WO 2019/189639 A1 | 10/2019 |
| WO | WO 2020/039581 A | 2/2020 |

OTHER PUBLICATIONS

Kruth et al., "Benchmarking of Different SLS/SLM Processes as Rapid Manufacturing Techniques", Int. Cont. Polymers & Moulds Innovations (PMI), Apr. 20, 2005, pp. 1-6, XP002679185, (six (6) pages).

Japanese-language Office Action issued in Japanese Application No. 2020-216500 dated Feb. 13, 2024 with English translation (3 pages).

\* cited by examiner

EXAMPLE CUT POSITION FOR CROSS-SECTION OBSERVATION

SCHEMATIC DIAGRAM OF CROSS-SECTION DEFECTIVE PART BINARIZATION

ADDITIVE MANUFACTURING CONDITION SEARCH APPARATUS, ADDITIVE MANUFACTURING CONDITION SEARCH METHOD, AND REFERENCE SAMPLE

CLAIM OF PRIORITY

The present application claims priority from Japanese Patent application serial No. 2020-216500, filed on Dec. 25, 2020, the content of which is hereby incorporated by reference into this application.

TECHNICAL FIELD

The present invention relates to an additive manufacturing condition search apparatus, an additive manufacturing condition search method, and a reference sample.

BACKGROUND ART

It is known that additive manufacturing (laminate molding) is performed by using, for example, a powder bed fusion method or a directed energy deposition method. The powder bed fusion method performs additive manufacturing by irradiating evenly spread powder with a light beam (e.g., a laser beam or an electron beam). The powder bed fusion method includes, for example, an SLM (Selective Laser Melting) process and an EBM (Electron Beam Melting) process. The directed energy deposition method performs additive manufacturing by controlling the irradiation of a light beam and the position of a powder material discharge head. The directed energy deposition method includes, for example, an LMD (Laser Metal Deposition) process and a DMP (Direct Metal Deposition) process.

Meanwhile, appropriate material-specific manufacturing conditions (recipe) need to be set for the above-described additive manufacturing. Particularly, when the powder bed fusion method is used, there are a wide variety of control parameters, so that a considerable amount of labor is required to derive appropriate manufacturing conditions.

Incidentally, artificial intelligence has grown rapidly in recent years due to an increased processing speed of computers. For example, Patent Documents 1 and 2 state that laser processing condition data is generated by machine learning. These patent documents state that pass/fail evaluation of molding is made by monitoring a molding state. Further, Patent Document 3 states that a process window is created by making pass/fail evaluation of molding, based on a sample image.

PRIOR ART DOCUMENTS

Patent Documents

Patent Document 1: JP-2017-164801-A
Patent Document 2: JP-2020-015944-A
Patent Document 3: PCT Patent Publication No. WO 2020/039581

SUMMARY OF THE INVENTION

Problems to be Solved by the Invention

In powder bed fusion, it is not easy to determine the manufacturing conditions because there are various factors of manufacturing conditions. Even a set of conditions for filling the inside of a molded object includes, for example, heat source output, scan rate, scan line spacing, scan line length, and laminate thickness. Therefore, it is necessary to manufacture and evaluate a large number of molded objects in order to determine optimal conditions. Consequently, establishing the process window requires an enormous amount of cost and time, and the established process window may vary from one experimenting person to another. Further, the process window is effective for searching for conditions for reducing an internal defect rate of a molded object. However, even in a case where molding is performed within the range of the process window, a melted state may change to cause poor molding if, for example, the area of the molded object is significantly changed.

The present invention has been made in view of the above circumstances. An object of the present invention is to provide an apparatus and method for searching for molding conditions of an additive manufacturing apparatus based on the powder bed fusion method that are remarkably more efficient and accurate than conventional counterparts. Another object of the present invention is to provide a reference sample for searching for the molding conditions of the additive manufacturing apparatus.

Means for Solving the Problems

In accomplishing the above objects, according to an aspect of the present invention, there is provided an additive manufacturing condition search apparatus for searching for manufacturing conditions of an additive manufacturing apparatus based on the powder bed fusion method. The additive manufacturing condition search apparatus includes a processor and a memory. The processor receives a molding result of a reference sample manufactured by the additive manufacturing apparatus, conditions corresponding to the molding result of the reference sample, evaluation target values of the reference sample, and a search region defined by the conditions and scope of the molding result. Based on settings for the conditions within the search region and on the molding result obtained when the settings are given to the additive manufacturing apparatus or to a control region of the additive manufacturing apparatus, the processor generates a predictive model indicative of relation between the conditions and the molding result. The processor gives the received evaluation target values to the predictive model, and thus calculates predicted values from the predictive model. The processor then transmits the predicted values to the additive manufacturing apparatus or the control region of the additive manufacturing apparatus, causes the additive manufacturing apparatus to conduct a demonstration experiment, and acquires a result of the demonstration experiment as measured values. The processor determines whether the evaluation target values are achieved by the measured values. If the evaluation target values are achieved, the processor outputs the predicted values as the settings for the conditions. If the evaluation target values are not achieved, the processor optimizes the additive manufacturing conditions by adding the predicted values and the measured values to the settings for the conditions and to the molding result and thus updating the predictive model. The reference sample has at least three smooth surfaces and a surface having aggregated punched holes formed by straight lines and curved lines that are involved in three types of regions to be set as the conditions, namely, a fill region of a molding region, a region for forming an overhang, and a region for forming an outermost surface in a direction of molding height. Slice data of the reference sample is formed by at least two independent regions in an optional layer at a center in a lamination direction, and includes a small region and a large region. The small region has a width of 1 mm or less and is cut off from an outer edge of the reference sample. The large region is formed by a portion other than the small region.

According to another aspect of the present invention, there is provided an additive manufacturing condition search method that is used by the additive manufacturing condition search apparatus.

According to yet another aspect of the present invention, there is provided a reference sample for acquiring information indicative of the relationship between a molding result of an additive manufacturing apparatus and manufacturing conditions corresponding to the molding result. The reference sample has at least three smooth surfaces and a surface having aggregated punched holes formed by straight lines and curved lines that are involved in a fill region of a molding region, a region for forming an overhang, and a region for forming an outermost surface in the direction of molding height. Slice data of the reference sample has at least two independent regions in an optional layer at a center in a lamination direction, and includes a small region and a large region. The small region has a width of 1 mm or less and is cut off from the outer edge of the reference sample. The large region is formed by a portion other than the small region.

A more detailed configuration of the present invention is described in the appended claims.

Advantages of the Invention

The present invention relates to an apparatus and method for searching for molding conditions of an additive manufacturing apparatus based on the powder bed fusion method, and is able to provide an apparatus and method for searching for the molding conditions of the additive manufacturing apparatus that are remarkably more efficient and accurate than conventional counterparts, and provide a reference sample for searching for the molding conditions of the additive manufacturing apparatus.

Problems, configurations, and advantages other than those described above will become apparent from the following description of embodiments.

MODE FOR CARRYING OUT THE INVENTION

Embodiments of the present invention will now be described with reference to the accompanying drawings. It should be noted, however, that components described in conjunction with the embodiments are merely illustrative, and that the technical scope of the present invention is not limited to the components.

First Embodiment

<Additive Manufacturing Apparatus>

Figure 1:
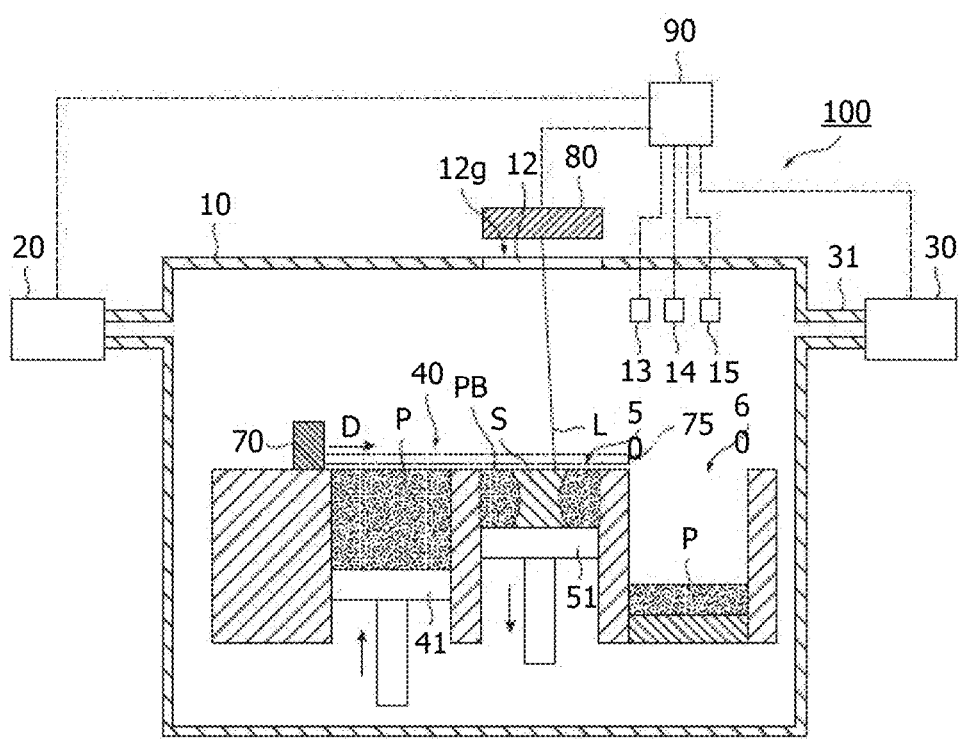
FIG. 1 is a diagram illustrating an example configuration of an additive manufacturing apparatus.

FIG. 1 is a diagram illustrating an example configuration of an additive manufacturing apparatus. Referring to FIG. 1, the following describes the additive manufacturing apparatus 100 to which a search apparatus and method according to the present invention can be applied. The additive manufacturing apparatus 100 is based on a powder bed fusion method. The additive manufacturing apparatus 100 manufactures a molded object S by irradiating layered metal powder PB with a light beam L, heating the metal powder PB to allow it to melt and solidify, and repeating powder spreading and light beam irradiation.

The additive manufacturing apparatus 100 includes, for example, a chamber 10, a gas supply section 20, an exhaust mechanism 30, a material supply section 40, an additive manufacturing section 50, a recovery section 60, a squeegee 70, a light beam source 80, and a control section 90.

The chamber 10 accommodates all sections of the additive manufacturing apparatus 100 except the beam source 80 and the exhaust mechanism 30. The chamber 10 has a transparent window 12 that is fitted with protective glass 12*g*. A laser beam L applied from the beam source 80 disposed outside the chamber 10 penetrates through the transparent window 12 and reaches a powder floor PB placed on a stage 51 of the additive manufacturing section 50 in the chamber 10.

Further, for example, a temperature sensor 13, a pressure sensor 14, and an oxygen sensor 15 are disposed in the additive manufacturing apparatus 100. Although simplified in FIG. 1, the temperature sensor 13 includes a contact temperature sensor and a non-contact temperature sensor. The contact temperature sensor is a thermocouple or other temperature sensor that measures the temperature of the stage 51. The non-contact temperature sensor is an infrared thermometer or other temperature sensor that measures the temperature of the powder floor PB formed on the stage 51. The pressure sensor 14 and the oxygen sensor 15 measure the pressure in a decompressed environment and the amount of oxygen (oxygen concentration) within the chamber 10, respectively. Furthermore, although not depicted, the chamber 10 may include, for example, a camera for photographing the powder floor PB formed on the stage 51 of the additive manufacturing section 50.

The gas supply section 20 is connected to the chamber 10 and used to supply an inert gas to the inside of the chamber 10. The gas supply section 20 includes, for example, a gas supply source and a control valve that are not depicted. The gas supply source includes a high-pressure tank filled with the inert gas. The control valve is controlled by the control section 90 and used to regulate the flow rate of the inert gas, which is supplied from the gas supply source to the chamber 10. For example, nitrogen or argon may be used as the inert gas.

The exhaust mechanism 30 includes a vacuum pump and is connected to the chamber 10 through an evacuation piping 31. The exhaust mechanism 30 may be controlled by the control section 90 and used to exhaust a gas from the chamber 10 for the purpose of reducing the pressure in the chamber 10 from atmospheric air pressure to vacuum pressure and thus creating the decompressed environment in the chamber 10.

The material supply section 40 is provided in a recessed manner so as to be able to collect material powder P. The top of the material supply section 40 is open so as to form an opening at the upper end thereof. The material supply section 40 includes a stage 41 that can be vertically moved to supply the material powder P placed on it. The stage 41 forms a bottom wall of the material supply section 40. An appropriate lifting mechanism is employed to vertically move the stage 41 in predetermined increments. The lifting mechanism for the stage 41 is connected to and controlled by the control section 90. Further, the material supply section 40 need not always be of a lifting type, but may be configured to drop the material powder P for supply purposes.

The material powder P to be used for additive manufacture of the molded object S is not particularly limited. For example, powder of metal material such as hot work tool steel, copper, titanium alloy, nickel alloy, aluminum alloy, cobalt-chromium alloy, or stainless steel, powder of resin material such as polyamide, and powder of ceramics may be used as the material powder P. As the material powder P, the additive manufacturing apparatus 100 according to the first embodiment is capable of using powder of metal material having an average particle size of approximately 30 μm and a particle size range of approximately 15 to 45 μm. The average particle size of the powder to be used is not limited to the above range.

The additive manufacturing section 50 is similar to the earlier-described material supply section 40 in that the former is provided in a recessed manner so as to be able to collect the material powder P, and that the top of the additive manufacturing section 50 is open so as to form an opening at the upper end thereof. The additive manufacturing section 50 includes the stage 51 that is used for spreading the material powder P to form the powder floor PB. The stage 51 forms a bottom wall of the additive manufacturing section 50. The material powder P, which is supplied from the material supply section 40, and the molded object S, which is additively manufactured, are placed on the stage 51.

The opening in the additive manufacturing section 50 and the opening in the material supply section 40 are approximately equal in vertical height and arranged substantially in the horizontal direction. The stage 51 for additive manufacturing is similar to the earlier-described stage 41 for material supply in that the former is provided with an appropriate lifting mechanism and able to be vertically moved in predetermined increments. Further, the stage 51 may include a preheating mechanism having a heater for preheating the stage 51. The lifting mechanism and preheating mechanism of the stage 51 are, for example, connected to and controlled by the control section 90.

The recovery section 60 is similar, for example, to the earlier-described material supply section 40 in that the former is provided in a recessed manner so as to be able to collect the material powder P, and that the top of the recovery section 60 is open so as to form an opening at the upper end thereof. In the illustrated example, a bottom wall of the recovery section 60 is fixed to the lower end thereof. However, the bottom wall of the recovery section 60 may be formed by a liftable stage, as is the case with the material supply section 40 and the additive manufacturing section 50. The opening in the recovery section 60 and the opening in the additive manufacturing section 50 are approximately equal in vertical height and arranged substantially in the horizontal direction. The recovery section 60 collects and recovers excess material powder P that is supplied, for example, by a recoater 70 from the material supply section 40 to the additive manufacturing section 50.

The recoater 70 forms the powder floor PB on the stage 51 by transporting the material powder P, which is supplied from the material supply section 40, onto the stage 51 of the additive manufacturing section 50 and evenly spreading the material powder P over the stage 51. The recoater 70 includes a transport mechanism 75. The transport mechanism 75 is, for example, a linear motor, and used to transport the recoater 70 along a substantially horizontal advancing direction D from the material supply section 40 to the additive manufacturing section 50.

The beam source 80 may be a laser light source that generates the light beam L having an output of approximately several watts to several kilowatts. The beam source 80 of the additive manufacturing apparatus 100 according to the present embodiment is a laser light source that generates a single mode fiber laser beam having a wavelength of 1080 nm and an output of 500 W, that is, a laser beam having an energy intensity distribution of a Gaussian form. Further, the beam source 80 includes a galvano scanner for scanning the powder floor PB with the light beam L.

Here, the light beam includes a laser beam, an electron beam, and various other beams capable of melting the metal powder P. Further, the laser beam may be one of various laser beams such as a laser beam having a near-infrared wavelength, a $CO_2$ laser beam (far-infrared laser beam), and a semiconductor laser beam. The laser beam to be used is determined based on target metal powder P.

The control section 90 is formed by a microcontroller and firmware. The control section 90 includes a processing device such as a CPU, a storage device such as a RAM or a ROM, programs and data stored in the storage device, and an input/output section for exchanging signals with various sections of the additive manufacturing apparatus 100. The control section 90 controls the gas supply section 20, the exhaust mechanism 30, the material supply section 40, the additive manufacturing section 50, and the beam source 80 by executing the programs, which are stored in the storage device by the storage device by the processing device. Further, the control section 90 receives as inputs, for example, an output from the camera and the results of detection by the temperature sensor 13, the pressure sensor 14, and the oxygen sensor 15.

<Reference Sample for Searching for Manufacturing Conditions for Powder Bed Fusion>

Figure 2A:
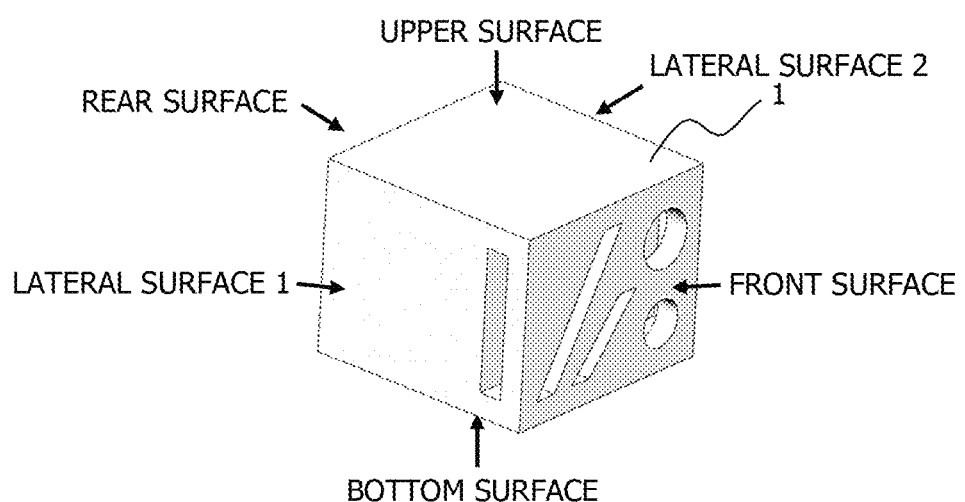
FIG. 2A is a schematic diagram illustrating an example shape of a reference sample.
Figure 2B:
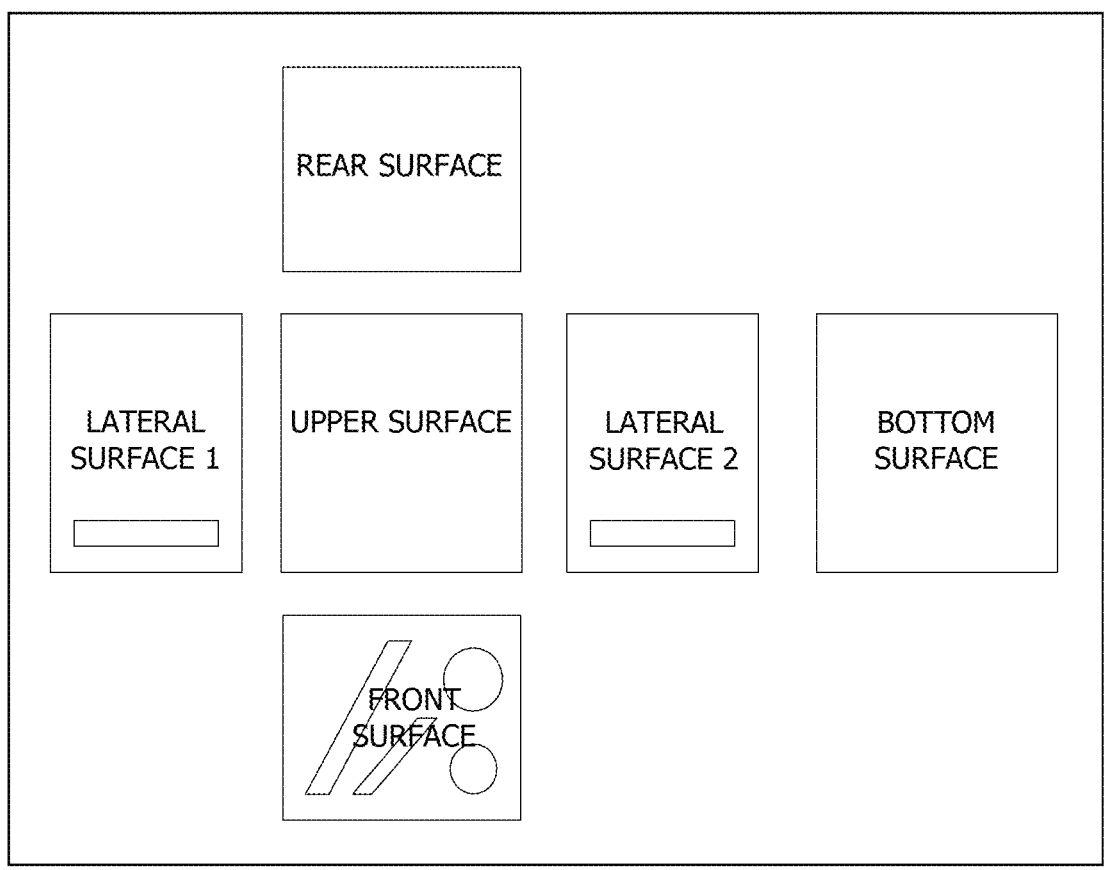
FIG. 2B is a cross-sectional view illustrating the example shape of the reference sample.
Figure 3A:
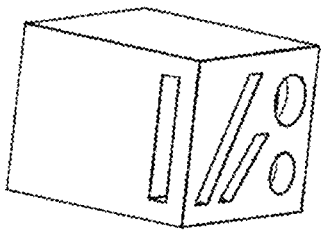
FIG. 3A is a schematic diagram illustrating an example shape of the reference sample.
Figure 3B:
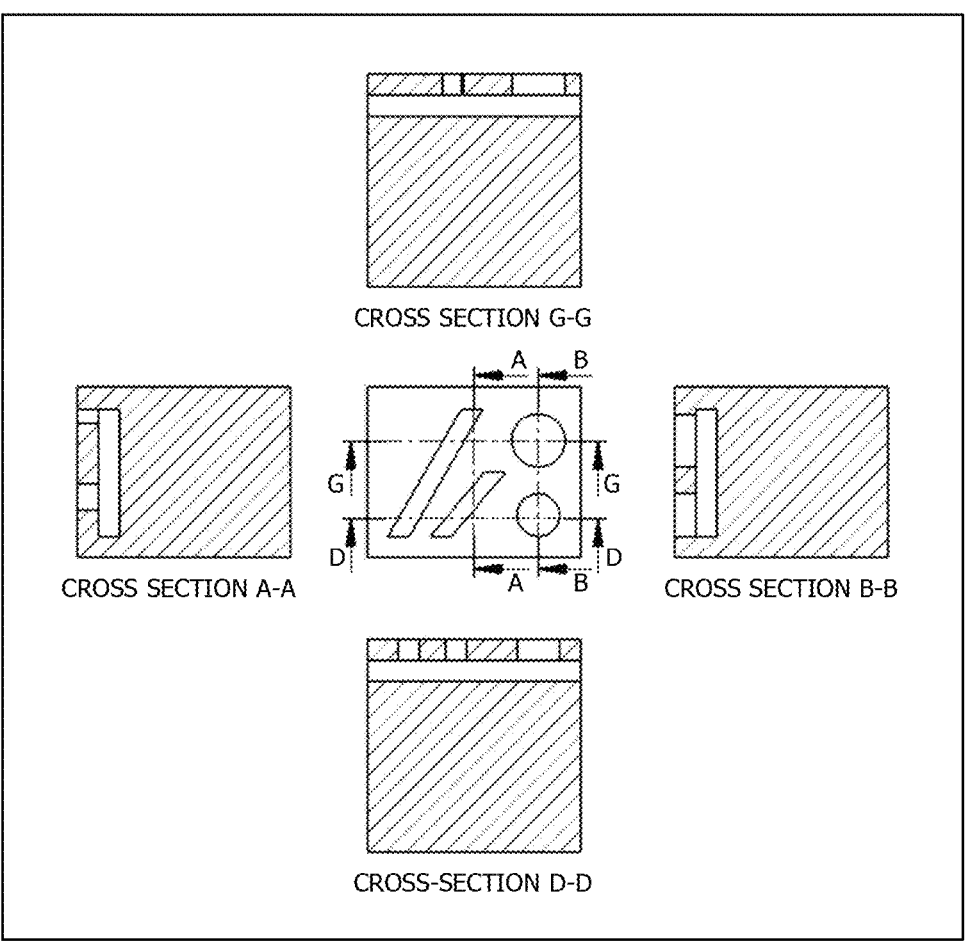
FIG. 3B is a set of cross-sectional views illustrating the example shape of the reference sample.

A reference sample for searching for additive manufacturing conditions for powder bed fusion will now be described. FIG. 2A is a schematic diagram illustrating an example shape of the reference sample, and FIG. 2B is a cross-sectional view illustrating the example shape of the reference sample. Further, FIG. 3A is a schematic diagram illustrating an example shape of the reference sample, and FIG. 3B is a set of cross-sectional views illustrating the example shape of the reference sample. The reference sample depicted in FIGS. 2A and 2B is shaped like a hexahedral block as a whole, and its bottom, upper, and rear surfaces are smooth. The front surface of the reference sample is provided with punched holes that are shaped like a parallelogram and like a circle. The front surface has two independent regions in any cross section in a lamination direction (e.g., a cross section D-D or a cross section G-G in FIG. 3B), namely, a small region and a large region. The small region has a width of 1 mm or less and is cut off from the outer edge of the reference sample. The large region is formed by a portion other than the small region.

For example, in a case where a process window under fill (in-skin) conditions for a molding region is derived based on a simple block shape, and a fine shape is created by molding within the range of the process window, heat is likely to accumulate and cause an overmelted state in the small-area region. Then, deformation occurs to make the shape swell. As a result, the squeegee may come into contact with the molded object and stop or destroy the molded object when powder is spread on the next layer.

When the manufacturing conditions are searched for by using the reference sample having the above-described shape, it is possible to derive the manufacturing conditions that successfully cope with a molded object including regions different in molding area, particularly a molded object including a small region.

Figure 4A:
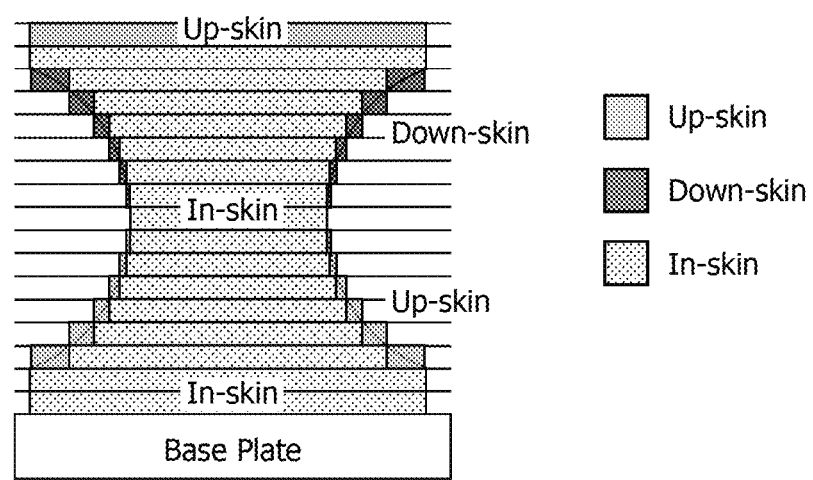
FIG. 4A is a diagram illustrating three types of regions of a cross section of the reference sample, namely, a fill region (in-skin), a region for forming an overhang (down-skin), and a region for forming an outermost surface in the direction of molding height (up-skin).
Figure 4B:
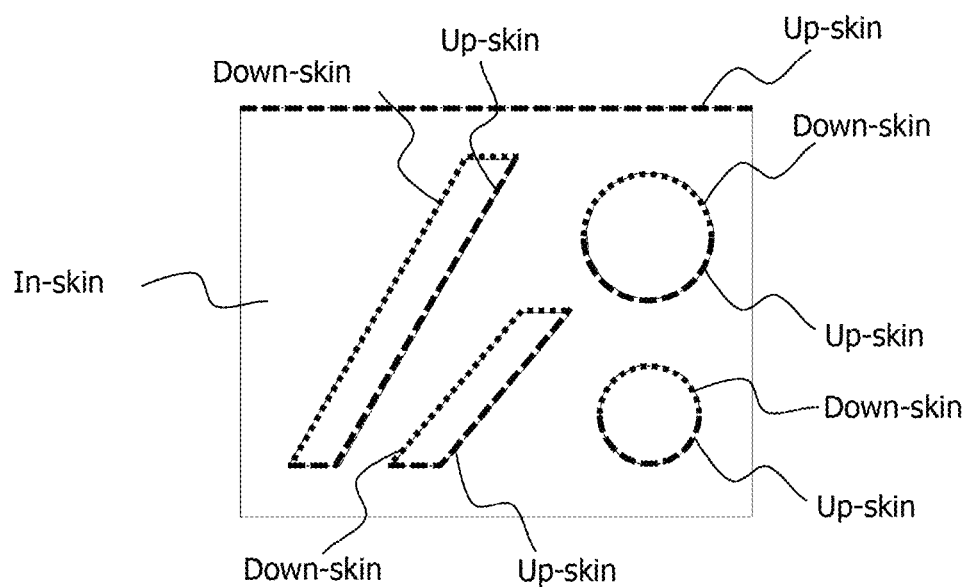
FIG. 4B is a schematic front view of the reference sample.
Figure 4C:
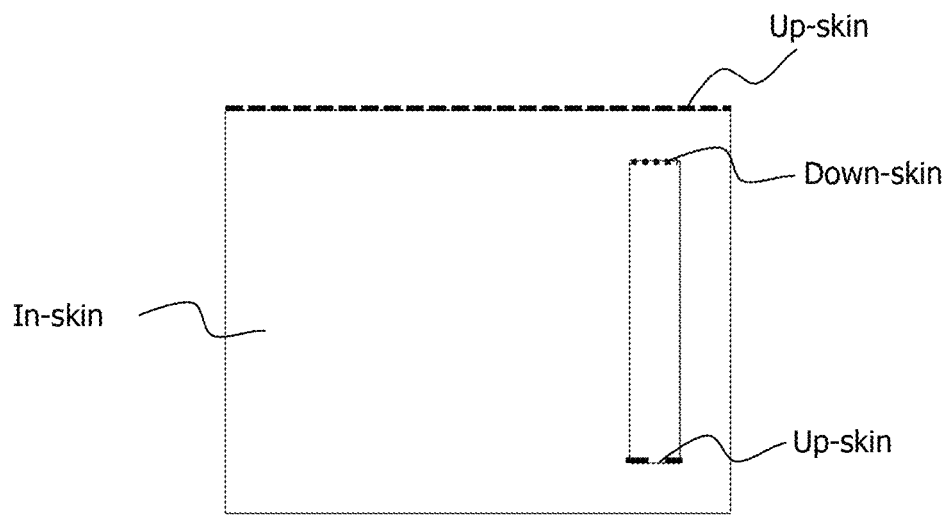
FIG. 4C is a schematic side view of the reference sample.

FIG. 4A is a diagram illustrating three types of regions of a cross section of the reference sample, namely, a fill region (in-skin), a region for forming an overhang (down-skin), and a region for forming an outermost surface in the direction of molding height (up-skin). FIG. 4B is a schematic front view of the reference sample. FIG. 4C is a schematic side view of the reference sample.

Referring to FIGS. 4A to 4C, the fill region (in-skin) of the molding region serves as a base for forming a molded object. For overhang formation (down-skin) in a case where a three-dimensional shape is converted into slice data for each laminate thickness, optional slice data regarding a layer is compared with slice data regarding a layer one layer earlier (or a plurality of earlier layers). If the comparison indicates that no molding region exists in the slice data regarding the layer one layer earlier (or the plurality of earlier layers), and that a molding region exists in the optional slice data, conditions different from those for the fill (in-skin) of the molding region are set. When powder is irradiated with a beam in a case where nothing fuses with melted powder or heat dissipation cannot be achieved promptly by thermal conduction, the melted powder contracts into a spherical shape to form a relatively large spherical lump on the powder. This phenomenon is called "balling." When balling occurs, the surface state of the overhang section is placed in a bad condition, and the lump formed by balling is unexpectedly transported at the time of powder spreading. As a result, nothing is left. Consequently, the conditions for suppressing energy consumption are selected for overhang formation (down-skin).

For forming the outermost surface in the direction of molding height (up-skin) in a case where the three-dimensional shape is converted into slice data for each laminate thickness, optional slice data regarding a layer is compared with slice data regarding a layer one layer earlier (or a plurality of earlier layers). If the comparison indicates that no molding region exists in the slice data regarding the layer one layer earlier (or the plurality of earlier layers), and that a molding region exists in the optional slice data, conditions different from those for the fill (in-skin) of the molding region are set.

Conventionally, after the process window under the fill (in-skin) conditions for a molding region is set based on the simple block shape, the conditions for forming the overhang (down-skin) and forming the outermost surface in the direction of molding height (up-skin) are selected by using an inclined shape sample. However, the conditions for constructing these three types of regions are such that the regions are molded while they affect each other. Therefore, the action of molding varies from one part to another when parts differ in molding area. Meanwhile, when evaluation is made by using a shape working on various construction conditions, such as the shape of the reference sample, it is possible to approximate appropriate manufacturing conditions, and it is also possible to quickly reach the appropriate manufacturing conditions by making use of machine learning.

When the reference sample is used, shape measurements can be made by acquiring an image of the front surface of the reference sample or displacement data as far as shape reproducibility evaluation parts are aggregated on the front surface. Even if shape reproducibility is degraded (due to a disordered and destroyed shape) when surface roughness and internal defect rate are measured in a large-area region, the surface roughness and the internal defect rate are insignificantly affected. Therefore, individual evaluation items can be measured accurately and easily. Further, molding difficulty can be changed by changing the angle and width of a parallelogram and the diameter of a circle.

<Manufacturing Conditions and Reference Sample Molding Result Measurement>

An example where 24 control factors are varied to create 24 manufacturing condition datasets and additively manufacture the reference sample with the additive manufacturing apparatus will now be described in conjunction with the first embodiment. Here, the control factors are scale corrections in the x, y, and z directions; the amount of offset from a contour line on CAD data for contour line irradiation; the output and scan rate of a light beam applied on the contour line; the amount of offset from a contour line irradiation position, scan line spacing, scan patterns, scan line length, offset amount between scan patterns, and output and scan rate of the light beam for molding region fill (in-skin); the offset amount from the contour line irradiation position, scan line spacing, scan patterns, scan line length, offset amount between scan patterns, and output and scan rate of the light beam for overhang formation (down-skin); and the offset amount from the contour line irradiation position, presence or absence of provision of double irradiation, scan line spacing, and output and scan rate of the light beam for forming the outermost surface in the direction of molding height (up-skin). However, the above-mentioned control factors are merely illustrative and not restrictive. The technical scope of the present invention is not limited to the above-mentioned control factors.

Figure 5A:
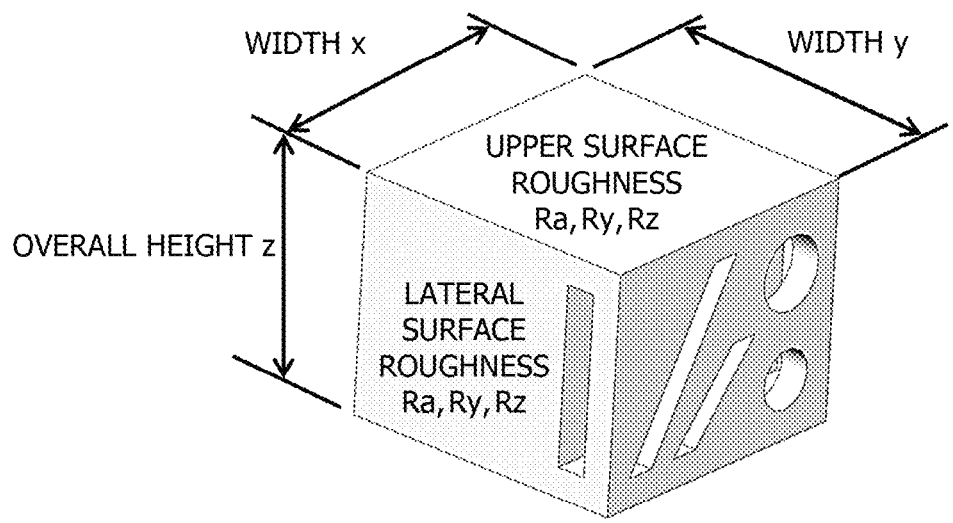
FIG. 5A is a diagram illustrating an example measurement method for an additively manufactured reference sample.
Figure 5B:
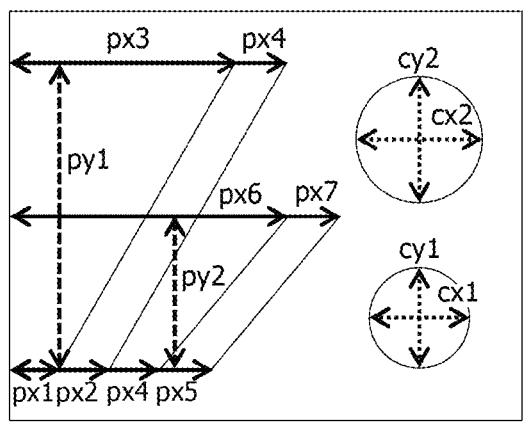
FIG. 5B is a diagram illustrating the example measurement method for the additively manufactured reference sample.
Figure 5C:
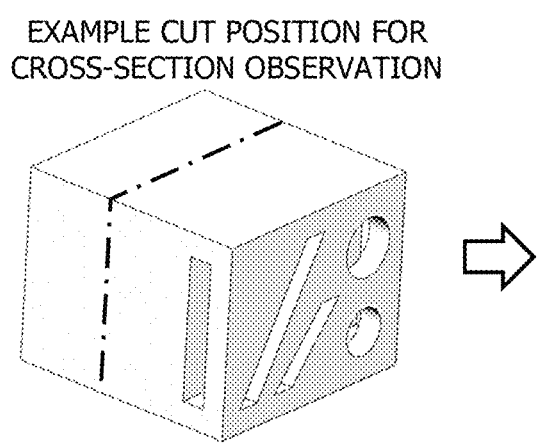
FIG. 5C is a diagram illustrating the example measurement method for the additively manufactured reference sample.
Figure 5C:
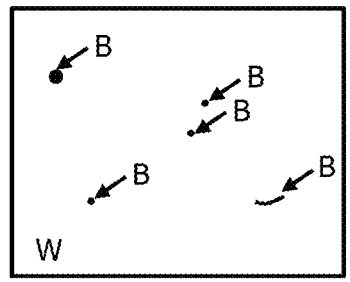

FIGS. 5A to 5C are diagrams illustrating an example measurement method for the additively manufactured reference sample. The result of molding of an additively manufactured reference sample shape was obtained by measuring the overall height, width (in two directions), lateral surface roughness (arithmetic average roughness Ra, maximum height Ry, and ten-point average roughness Rz), upper surface roughness (arithmetic average roughness Ra, maximum height Ry, and ten-point average roughness Rz) of the reference sample, the average dimensional error in width direction and average dimensional error in height direction of parallelogramic punched holes, and the average dimensional errors in width and height directions of circular punched holes, and by visually judging the degree of damage to the parallelograms and the degree of damage to the circles by using a numerical rating scale from 0 to 3, where 0 represented a high accuracy of shape reproduction and 3 represented a destroyed or otherwise degraded shape. Further, the cross section of the reference sample was observed to measure a cross-sectional defect rate.

<Example Hardware Configuration of Search Apparatus>

Figure 6:
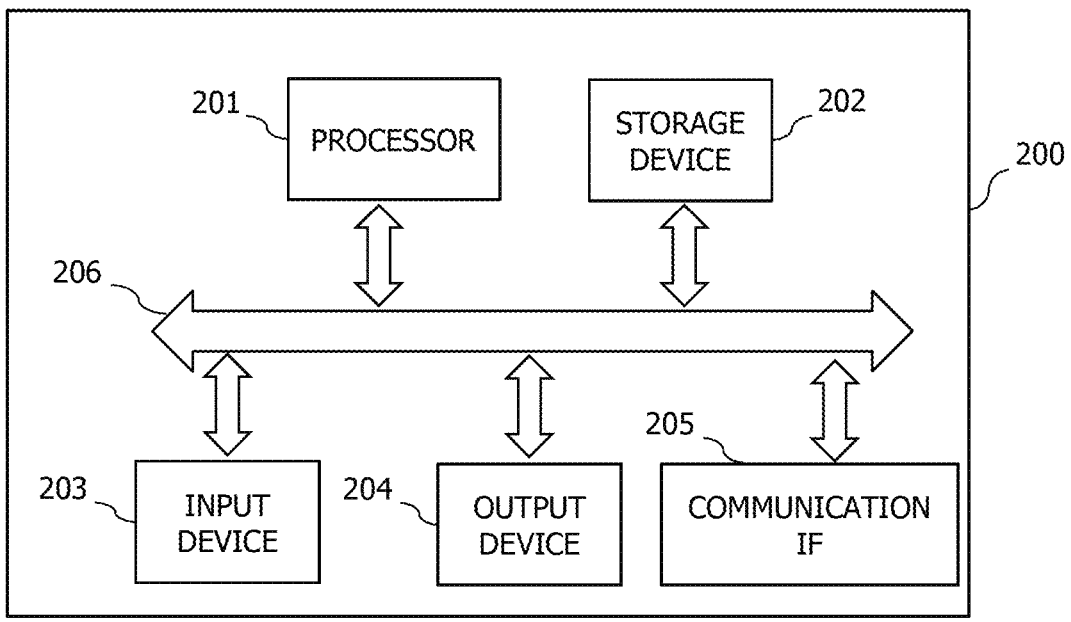
FIG. 6 is a block diagram illustrating an example hardware configuration of a search apparatus.

FIG. 6 is a block diagram illustrating an example hardware configuration of the search apparatus. The search apparatus 200 searches a search region for the values of input parameters that provide a solution. The search apparatus 200 includes a processor 201, a storage device 202, an input device 203, an output device 204, and a communication interface (communication IF 205). The processor 201, the storage device 202, the input device 203, the output device 204, and the communication IF 205 are connected with each other by a bus 206. The processor 201 controls the search apparatus 200. The storage device 202 serves as a work area for the processor 201. Further, the storage device 202 is a non-transitory or transitory recording medium for storing various programs and data. For example, a ROM (Read Only Memory), a RAM (Random Access Memory), a HDD (Hard Disk Drive), or a flash memory may be used as the storage device 202. The input device 303 receives an input of data. For example, a keyboard, a mouse, a touch panel, a numeric keypad, or a scanner may be used as the input device 203. The output device 204 outputs data. For example, a display or a printer may be used as the output device 204. The communication IF 205 is connected to a network to transmit and receive data.

<Example Functional Configuration of Search Apparatus 200>

Figure 7:
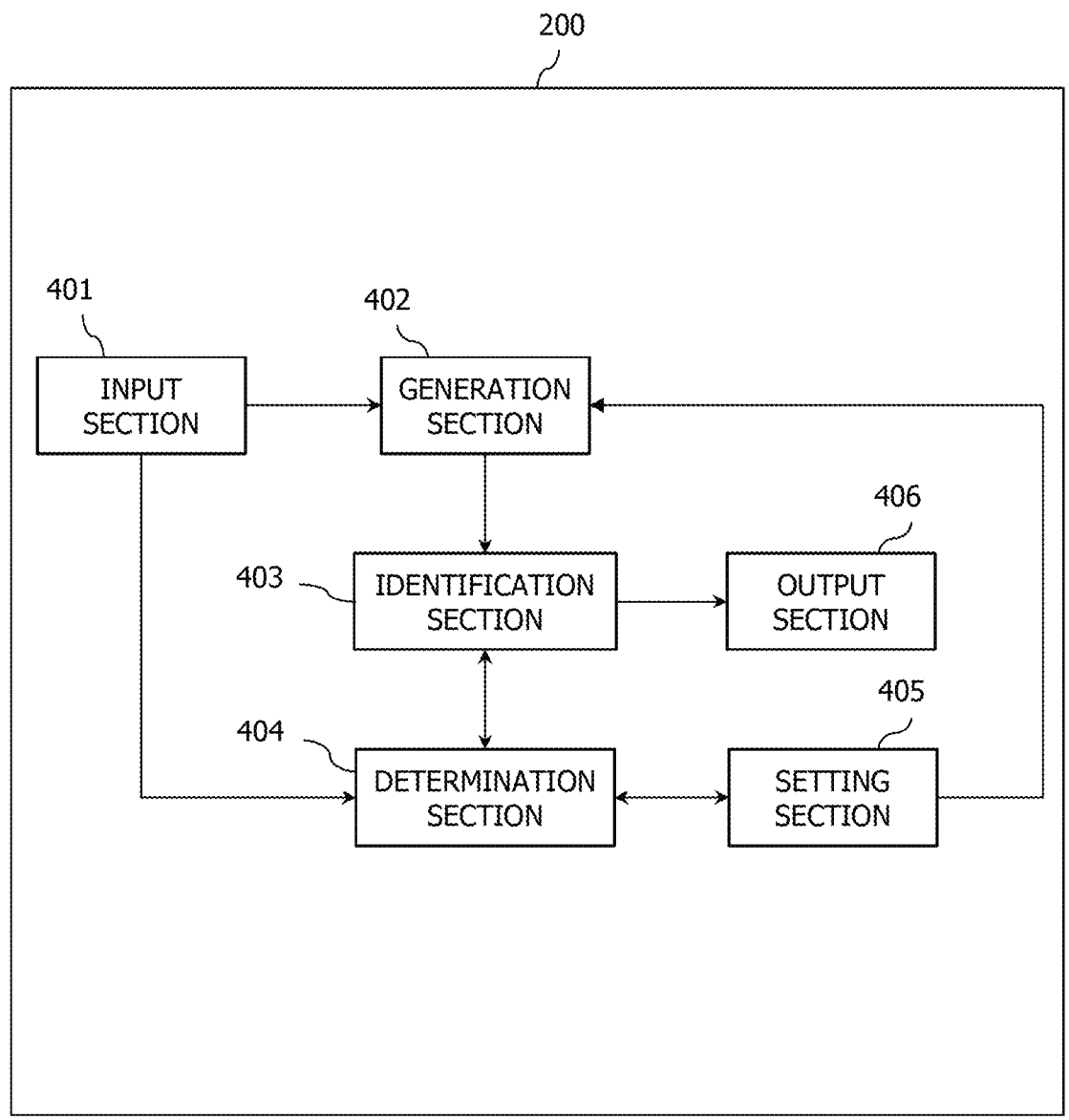
FIG. 7 is a block diagram illustrating an example functional configuration of the search apparatus.

FIG. 7 is a block diagram illustrating an example functional configuration of the search apparatus 200. The search apparatus 200 includes an input section 401, a generation section 402, an identification section 403, a determination section 404, a setting section 405, and an output section 406. More specifically, functions of these sections 401 to 406 are implemented when the processor 301 executes the programs stored, for example, in the storage device 202 depicted in FIG. 6.

The input section 401 receives various inputs of data that are inputted by a user operation or read from a database 305. More specifically, the input section 401 receives, for example, inputs of condition values to be set in the additive manufacturing apparatus 100. Conditions to be set in the additive manufacturing apparatus 100 are the above-mentioned input parameters. More specifically, the input parameters are, for example, the scale corrections in the x, y, and z directions; the amount of offset from the contour line on CAD data for contour line irradiation; the output and scan rate of the light beam applied on the contour line; the amount of offset from the contour line irradiation position, scan line spacing, scan patterns, scan line length, offset amount between scan patterns, and output and scan rate of the light beam for molding region fill (in-skin); the offset amount from the contour line irradiation position, scan line spacing, scan patterns, scan line length, offset amount between scan patterns, and output and scan rate of the light beam for overhang formation (down-skin); and the offset amount from the contour line irradiation position, presence or absence of provision of double irradiation, scan line spacing, and output and scan rate of the light beam for forming the outermost surface in the direction of molding height (up-skin).

Further, the input section 401 receives inputs of evaluation target values indicating a molding result (processing result) that is additively manufactured by the additive manufacturing apparatus 100. The processing result additively manufactured by the additive manufacturing apparatus 100 is represented by output parameters. Specifically, the output parameters include, for example, the molding result of a reference sample shape additively manufactured by the additive manufacturing apparatus 100 and data regarding the status of the additive manufacturing apparatus 100. More specifically, the molding result of the reference sample shape produced by the additive manufacturing apparatus 100 includes, for example, the measurements of overall height, width (in two directions), lateral surface roughness (arithmetic average roughness Ra, maximum height Ry, and ten-point average roughness Rz), upper surface roughness (arithmetic average roughness Ra, maximum height Ry, and ten-point average roughness Rz) of the sample, the measurements of the average dimensional error in width direction and average dimensional error in height direction of parallelogramic punched holes and the average dimensional errors in width and height directions of circular punched holes, and a cross-sectional defect rate that is determined by visually judging the degree of damage to the parallelograms and the degree of damage to the circles by using a numerical rating scale from 0 to 3, where 0 represents a high accuracy of shape reproduction and 3 represents a destroyed or otherwise degraded shape. The evaluation target values indicating the processing result obtained by allowing the additive manufacturing apparatus 100 to mold the reference sample shape are the design value and tolerance of a user-requested reference sample shape.

Moreover, the input section 401 receives inputs of standard condition values within the search region defined by the ranges of conditions (input parameters) and processing result (output parameters). The search region is a region that is defined by the control range of input parameters and the target range of output parameters of the additive manufacturing apparatus 100 and used to search for the values of the input parameters. More specifically, the search region is an input range that can be used to set the control factors of the additive manufacturing conditions, for example. The standard condition values are standard values of the input parameters. More specifically, the standard condition values are input parameter values obtained in the past, for example.

The generation section 402 generates a predictive model indicative of the relation between the conditions and the processing result, according to settings for the conditions within the search region and to measured values indicating the processing result obtained when the settings are given to the additive manufacturing apparatus 100. The settings for the conditions are, for example, the input parameter values prepared as learning data. The measured values indicating the processing result represent the processing result that is produced when the reference sample shape is molded in a case where the input parameter values (the settings for the conditions) prepared as the learning data are given to the additive manufacturing apparatus 100. The predictive model is a function indicating the relation between the input parameters and the output parameters. The generation section 402 generates the predictive model indicating the relation between the settings for the conditions within the search region and measured output values by performing a regression analysis supportive of the multiple-input and multiple-output capability, for example, of neural network and support vector machine, and performing a statistical analysis such as correlation analysis, principal component analysis, and multiple regression analysis.

The identification section 403 gives the evaluation target values, which are inputted from the input section 401, to the predictive model generated by the generation section 402, acquires predicted values corresponding to the evaluation target values from the predictive model, and identifies a predicted-value existence domain from the search region.

The determination section 404 determines whether the evaluation target value equivalents of the predicted values are closer to the evaluation target values than the standard values of the processing result inputted from the input section 401. More specifically, the determination section 404 determines, for example, error 1 and error 2. Error 1 is the error between the evaluation target value equivalents of the predicted values and the evaluation target values. Error 2 is the error between the processing result and the evaluation target values. In a case where error 1 is smaller than error 2, the determination section 404 determines that the evaluation target value equivalents of the predicted values are closer to target values than the standard values of the processing result. In a case where error 1 is not shorter than error 2, the determination section 404 determines that the target value equivalents of the predicted values are not closer to the target values than the standard values of the processing result.

In a case where it is determined by the determination section 404 that the target value equivalents of the predicted values are closer to the target values than the standard values of the processing result, the setting section 405 sets the predicted values and the target value equivalents of the predicted values as the standard values of the conditions and the standard values of the processing result, and then sets the predicted-value existence domain identified by the identification section 403 as the search region. This causes the standard values to approach the target values and narrows the search region down to the predicted-value existence domain.

In a case where the predicted values satisfy achievement conditions for target value achievement, the output section 406 outputs the predicted values that satisfy the achievement conditions. The achievement conditions represent, for example, the tolerance range of the target values. The output section 406 may display the predicted values satisfying the achievement conditions on a display, which is an example of the output device 204, transmit such predicted values to an external apparatus through the communication IF 205, or store such predicted values in the storage device 202 or the database 305.

<Search for Additive Manufacturing Conditions for Additive Manufacturing Apparatus 100>

A search for the additive manufacturing conditions is performed by conducting a demonstration experiment based on the predictive model and searching for an optimal solution achieving a target. Therefore, the result of the demonstration experiment (the processing result) is added to the learning data to repeatedly update the predictive model until the target is achieved. Further, the target is gradually updated to a final target in order to search for the optimal solution.

In the additive manufacture, the above-mentioned 24 manufacturing condition datasets are created to additively manufacture the reference sample with the additive manufacturing apparatus, and the predictive model is generated by using the demonstration experiment result (processing result) as the learning data.

The search apparatus 200 generates the predictive model from the learning data to which the demonstration experiment result is added, and then calculates the result of prediction by using the predictive model. The optimal solution can be searched for by repeating the above processing until the target is achieved by the demonstration experiment result (processing result), which is obtained by using the above derived prediction result as the manufacturing conditions.

Figure 8:
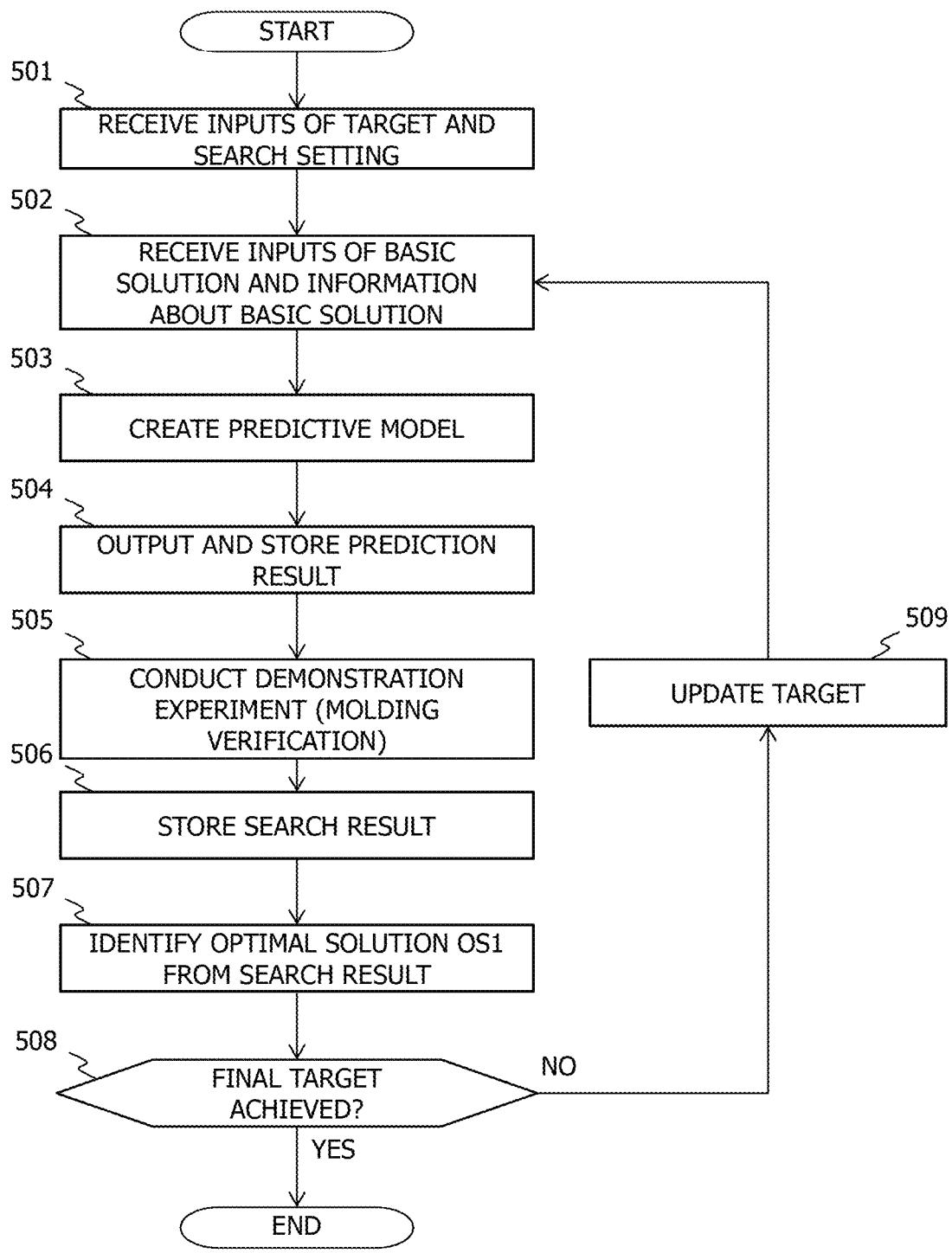
FIG. 8 is a flowchart illustrating a search for manufacturing conditions for the additive manufacturing apparatus.

FIG. 8 is a flowchart illustrating a search for the manufacturing conditions for the additive manufacturing apparatus 100 in the present embodiment.

The search apparatus 200 receives an input of the molding result of the reference sample additively manufactured by using a target additive manufacturing apparatus 100 (the target values of the reference sample molding result) and an input of a search setting (step 501). The search setting is, for example, the permissible value of difference or deviation between the search result and the target values.

Next, the search apparatus 200 receives an input of a basic solution and an input of information about the basic solution (step 502). More specifically, the search apparatus 200 receives, for example, inputs, for the above-mentioned 24 manufacturing condition datasets, of: input parameters and output parameters in the case of the use of the input parameters; the optimal solution before the start of search (the values of the input parameters) and the output parameters in the case of the use of the optimal solution; the target values of the output parameters before the start of search; and a model function explaining about the relation between the input parameters and the output parameters.

The search apparatus 200 generates the predictive model for predicting a solution (input parameters) that satisfies the target (the target values of the reference sample molding result) (step 505). More specifically, in step 505, the search apparatus 200 generates, as the predictive model, a function indicative of the relation between input and output data of the additive manufacturing apparatus 100 by using data (e.g., initial data) stored in the database 305. The input and output data is a set of the values of input parameters given to the additive manufacturing apparatus 100 (input data) and the measured values obtained from the molding result of the reference sample additively manufactured by the additive manufacturing apparatus 100 (output data). The relation between the input and output data may be analyzed by performing a regression analysis supportive of the multiple-input and multiple-output capability, for example, of neural network, support vector regression, and regression based on a kernel method. Further, the relation between the input and output data may be analyzed by performing a statistical analysis such as correlation analysis, principal component analysis, and multiple regression analysis.

Next, the search apparatus 200 uses the generated predictive model to predict parameters for acquiring a target solution or acquiring processing results close to the target solution, and stores the predicted parameters as the prediction result (step 506).

In order to search for the optimal solution through a single prediction, it is necessary to acquire and analyze data regarding all regions within the search range (the range of parameter settings applicable to the additive manufacturing conditions). However, as mentioned earlier, the number of parameter combinations enormously increases with an increase in the number of parameters. This enormously increases the length of time required for searching all the regions, and this makes it extremely difficult to achieve the intended purpose. In order to avoid the above problems and efficiently search for a solution, prediction and verification should be repeated by (a) acquiring model creation data, (b) creating the predictive model, (c) acquiring the prediction result, (d) conducting a prediction result demonstration experiment, and (a') adding demonstration experiment data to the model creation data.

The above steps (a), (b), (c), and (d) respectively correspond to steps 502, 503, 504, and 505 in FIG. 8. Further, step (a') corresponds to step 506. More specifically, the search apparatus 200 uses prediction conditions as search conditions, conducts a demonstration experiment, and acquires the input and output data of the additive manufacturing apparatus 100 under each set of search conditions as the demonstration experiment result, that is, as the search result.

The search apparatus 200 stores the search result in the database 305 (step 506). More specifically, the search apparatus 200 stores, in the database 305, as the search result, the input and output data, which is a set of input parameter values used for the demonstration experiment (step 505) and molding result values of the reference sample additively manufactured by the additive manufacturing apparatus 100, which are acquired by using the input parameter values.

Next, the search apparatus 200 identifies the optimal solution OS1 from the acquired data, and stores the identified optimal solution OS1 in the database 305 (step 507).

Subsequently, the search apparatus 200 determines whether the final target is achieved (step 508). If the final target is achieved ("YES" at step 508), the search apparatus 200 terminates a control process. Meanwhile, if the target is not achieved ("NO" at step 508), the search apparatus 200 proceeds to step 509, updates the target in step 509, and then proceeds to step 502 to update the learning data.

More specifically, if, for example, the output parameters corresponding to the updated optimal solution OS1 are equal to final target values or the deviation of such output parameters from the final target values is within the tolerance range, the search apparatus 200 determines in step 508 that the final target is achieved ("YES" at step 508).

Meanwhile, if the output parameters corresponding to the updated optimal solution OS1 are not equal to the final target values or the deviation of such output parameters from the final target values is not within the tolerance range, the search apparatus 200 determines that the final target is still not achieved ("NO" at step 508).

In step 509, the target values and the permissible value of difference or deviation between the search result and the target values are updated. If the final target is given from the beginning or an extremely small value is given as the permissible value of difference or deviation between the search result and the target values during the processing in steps 503 to 508, the degree of difficulty in achieving a better optimal solution OS1 may increase and cause a failure to find a solution. To avoid such a failure, at the initial stage of the search, a target different from the final target may be given as a present target. In a case where the present target is achieved and the final target is not satisfied ("NO" at step 508), the target values may be gradually made closer to the final target values in step 509. This increases the possibility of finding a solution for achieving the final target.

Further, in a case where, as the present target, a large value is given as the permissible value of difference or deviation between the search result and the target values, and in a case where the present target is achieved and the final target is not satisfied ("NO" at step 508), the target values may be gradually made closer to the final target values. This increases the possibility of finding a solution for achieving the final target.

A gradual update from an initial target to the final target may be performed by preparing a plurality of different target values intermediate between the initial target and the final target, giving the initial target as a first current target, and performing an update so as to set a target value closer to the final target as the current target value each time the current target is achieved. An alternative is to give the initial target as the first current target, and then prepare and use a plurality of different target values so as to approach the final target gradually at a constant rate.

Second Embodiment

When the reference sample is used for the manufacturing condition search performed by the additive manufacturing apparatus according to the first embodiment, the number of sets of molding conditions for moldable regions can be evaluated by conducting a single demonstration experiment.

Meanwhile, in a case where parameters regarding a molding environment are to be handled, the molding conditions need to be assigned to each molding environment. The parameters regarding the molding environment include, for example, laminate thickness, preheating temperature, molding environmental pressure, and powder particle size. Specifically, in the case of additive manufacture, the parameters regarding the molding environment cannot be changed by a single demonstration experiment. Therefore, it is necessary to change the manufacturing condition datasets each time the parameters regarding the molding environment are changed.

When the parameters regarding the molding environment are to be changed, the objective of such change needs to be clarified. It is necessary to clarify, for example, whether such change is to be made to optimize the above-mentioned molding conditions and the parameters regarding the molding environment or to determine the parameters regarding the molding environment. For example, the result of verification by the inventors of the present invention clarified that, when the additive manufacturing conditions were searched for by using the manufacturing condition datasets including laminate thickness, the conditions derived as the predicted values by the search apparatus 200 represented relatively decreased laminate thickness.

Consequently, in a case where laminate thickness is to be handled, it is preferable that required laminate thickness be determined in advance by an engineer and then optimized as a fixed condition as depicted in the flowchart of FIG. 8. However, if a deviation from a target value is detected during a predetermined development period, the optimal solution of the laminate thickness for a certain metal material can be determined by switching to a smaller laminate thickness for solution optimization.

Figure 9:
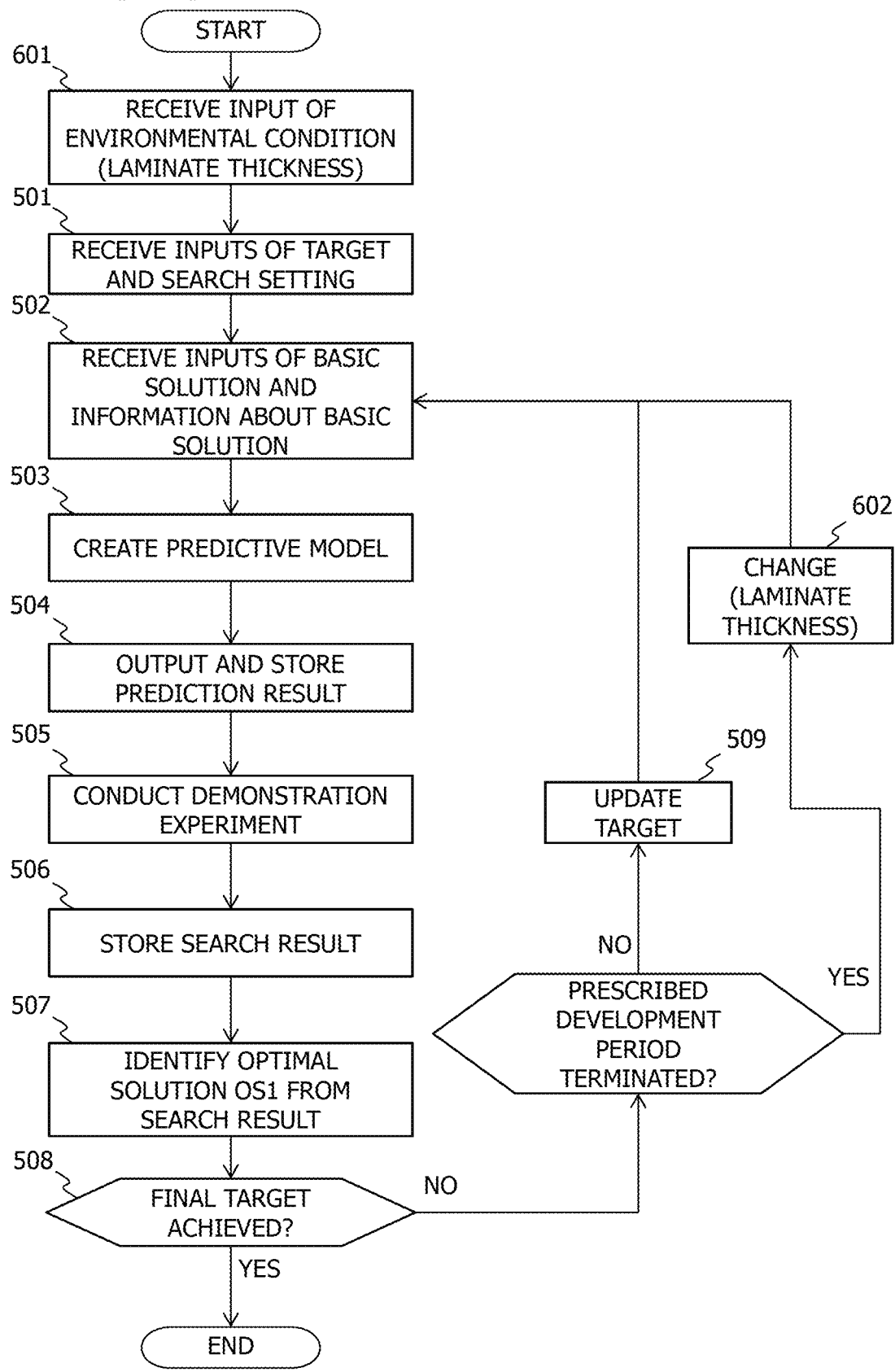
FIG. 9 depicts a second form of the flowchart illustrating the search for the manufacturing conditions for the additive manufacturing apparatus.

FIG. 9 is a flowchart illustrating a search for the additive manufacturing conditions in a case where the laminate thickness needs to be changed. As illustrated in FIG. 9, first of all, an environmental condition, such as the laminate thickness, is inputted. The parameters regarding the molding environment may be predetermined by a different method and inputted to the search apparatus according to the present invention.

Third Embodiment

Figure 10:
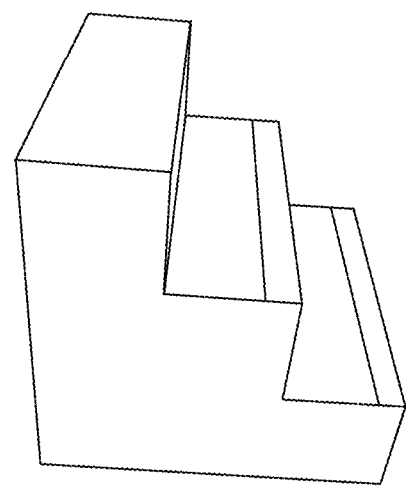
FIG. 10 illustrates a first form of a sample shape for crack sensitivity evaluation.
Figure 11:
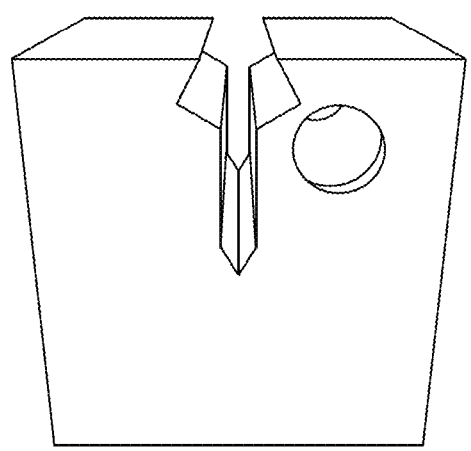
FIG. 11 illustrates a second form of the sample shape for crack sensitivity evaluation.

FIG. 10 illustrates a first form for crack sensitivity evaluation, and FIG. 11 illustrates a second form for crack sensitivity evaluation. In a case where the additive manufacturing conditions are searched for by using the manufacturing condition datasets including preheating temperature, the search apparatus 200 derives an optional temperature within a setting range as the predicted value. However, a heat input range significantly changes due to a change in the preheating temperature. This causes a problem that the experiment needs to be repeated an increased number of times.

Preheating is required in a case where the employed material cracks during additive manufacture. Therefore, an effective method is to use a metal material that cracks during additive manufacture, examine past data to adopt manufacturing conditions that can achieve molding through additive manufacture even when they are not optimized, use a sample that is cut as depicted in FIG. 10 or 11 and susceptible to stress concentration, search for a preheating temperature at which crack suppression can be provided, and then search for additive manufacturing conditions at a temperature enabling provision of crack suppression.

Figure 12:
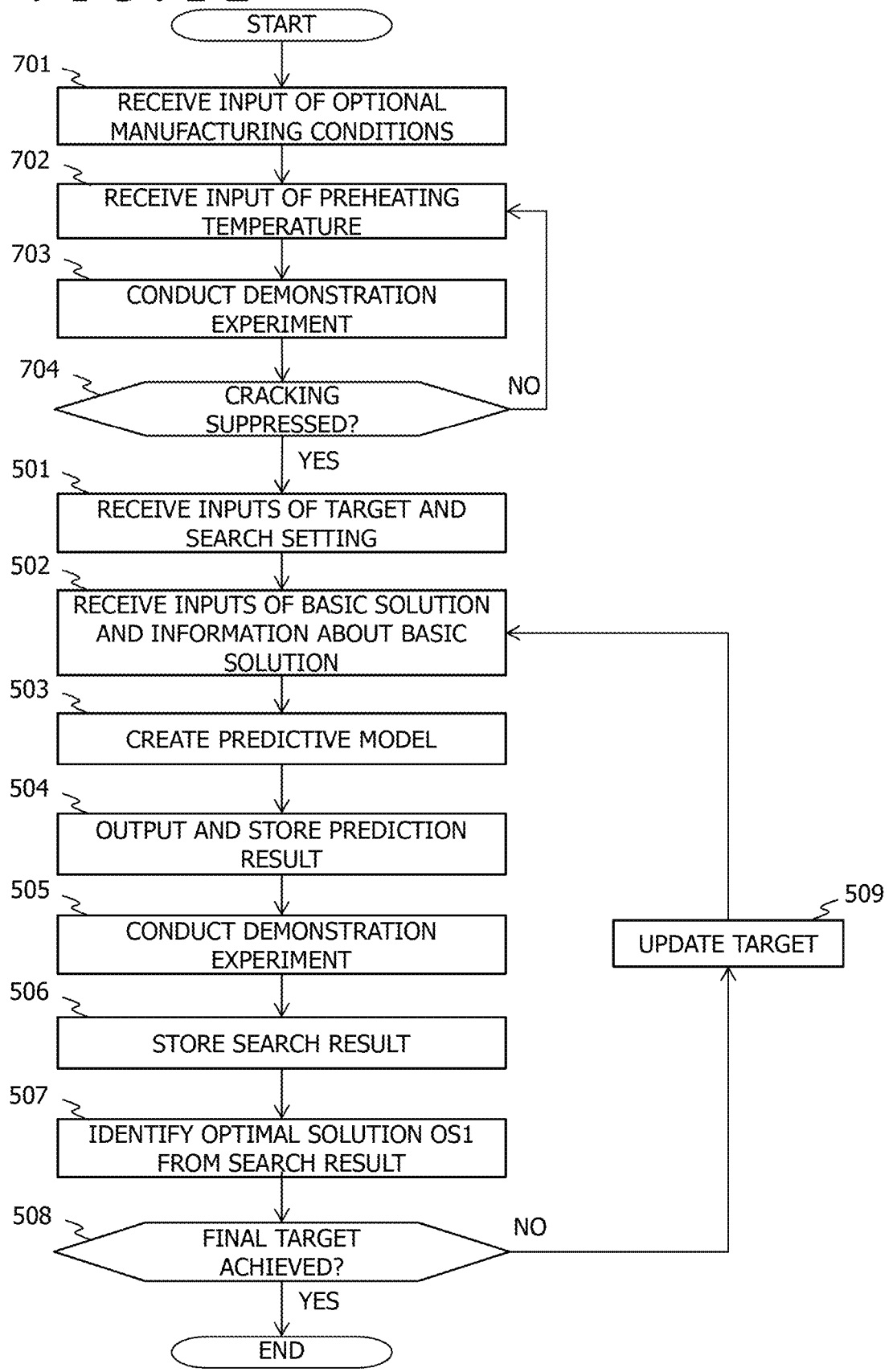
FIG. 12 depicts a third form of the flowchart illustrating the search for the manufacturing conditions for the additive manufacturing apparatus.

FIG. 12 is a flowchart illustrating the determination of a preheating temperature for crack suppression and the search for the manufacturing conditions at the preheating temperature.

The third embodiment makes it possible to search for the manufacturing conditions for successful target achievement by adopting a sample shape depicted in FIG. 10 through the use of a metal material cracking during additive manufacture, such as hot work tool steel, applying optional manufacturing conditions to search for a preheating temperature at which no cracking occurs, and then performing a manufacturing condition search by setting manufacturing condition datasets containing changed control factors.

As described above, the present invention is intended for a search for molding conditions of an additive manufacturing apparatus based on the powder bed fusion method, and is able to provide a search apparatus, a search method, and a reference sample for searching for molding conditions of an additive manufacturing apparatus that are remarkably more efficient and accurate than conventional counterparts.

It should be noted that the present invention is not limited to the foregoing embodiments, and includes various modifications. For example, the foregoing embodiments have been described in detail to facilitate the understanding of the present invention. The present invention is not necessarily limited to a configuration including all the above-mentioned components. Further, some components of an embodiment may be partly replaced by the components of another embodiment, and the components of an embodiment may be added to the components of another embodiment. Furthermore, some components of the individual embodiments may be subjected to the addition of other components, deleted, or replaced by other components.

DESCRIPTION OF REFERENCE NUMERALS

1: Reference sample
10: Chamber
20: Gas supply section
30: Exhaust mechanism
40: Material supply section
50: Additive manufacturing section
60: Recovery section
70: Squeegee
80: Light beam source
90: Control section
100: Additive manufacturing apparatus
200: Search apparatus
201: Processor
202: Storage device
203: Input device
204: Output device
205: Communication IF
401: Input section
402: Generation section
403: Identification section
404: Determination section
405: Setting section
406: Output section

The invention claimed is:

1. A search apparatus for searching for manufacturing conditions of an additive manufacturing apparatus based on a powder bed fusion method, the search apparatus comprising:
a processor; and
a memory, wherein
the processor receives a molding result of a reference sample manufactured by the additive manufacturing apparatus, conditions corresponding to the molding result of the reference sample, evaluation target values of the reference sample, and a search region defined by the conditions and scope of the molding result, and based on settings for the conditions within the search region and on the molding result obtained when the settings are given to the additive manufacturing apparatus or to a control region of the additive manufacturing apparatus, generates a predictive model indicative of relation between the conditions and the molding result,
the processor calculates predicted values from the predictive model by giving the received evaluation target values to the predictive model, transmits the predicted values to the additive manufacturing apparatus or the control region of the additive manufacturing apparatus to conduct a demonstration experiment, and acquires a result of the demonstration experiment as measured values,
the processor determines whether the evaluation target values are achieved by the measured values, if the evaluation target values are achieved, outputs the predicted values as the settings for the conditions, and if the evaluation target values are not achieved, optimizes the additive manufacturing conditions by adding the predicted values and the measured values to the settings for the conditions and to the molding result and thus updating the predictive model, and
the reference sample has at least three smooth surfaces and a surface having aggregated punched holes formed by straight lines and curved lines that are involved in three types of regions to be set as the conditions, namely, a fill region of a molding region, a region for forming an overhang, and a region for forming an outermost surface in a direction of molding height, and slice data of the reference sample has at least two independent regions in a layer at a center in a lamination direction, and includes a small region and a large region, the small region having a width of 1 mm or less and being cut off from an outer edge of the reference sample, the large region being formed by a portion other than the small region.

2. search apparatus according to claim 1, wherein the processor determines whether the evaluation target values are achieved by the measured values, and in response to the evaluation target values being achieved, gradually updates the evaluation target values to final evaluation target values, and repeatedly updates the predictive model until the final evaluation target values are achieved.

3. The search apparatus according to claim 1, wherein the processor searches the search region after a first generation of the predictive model, and updates the predictive model by using the result of the search.

4. The search apparatus according to claim 1, wherein the processor performs a prediction by using a plurality of different types of the predictive model, and acquires the predicted values from each of the different types of the predictive model.

5. The search apparatus according to claim 1, wherein the processor searches for the conditions in consideration of information about a parameter regarding a molding environment that is experimented in advance.

6. The search apparatus according to claim 5, wherein the parameter regarding the molding environment represents laminate thickness, preheating temperature, molding environmental pressure, or powder particle size.

7. A search method that uses a search apparatus for searching for manufacturing conditions of an additive manufacturing apparatus based on a powder bed fusion method, the search apparatus including a processor and a memory, the search method comprising the steps of:

causing the processor to receive a molding result of a reference sample manufactured by the additive manufacturing apparatus, conditions corresponding to the molding result of the reference sample, evaluation target values of the reference sample, and a search region defined by the conditions and scope of the molding result, and based on settings for the conditions within the search region and on the molding result obtained when the settings are given to the additive manufacturing apparatus or to a control region of the additive manufacturing apparatus, generate a predictive model indicative of relation between the conditions and the molding result;

causing the processor to calculate predicted values from the predictive model by giving the received evaluation target values to the predictive model, transmit the predicted values to the additive manufacturing apparatus or the control region of the additive manufacturing apparatus to conduct a demonstration experiment, and acquire a result of the demonstration experiment as measured values;

causing the processor to determine whether the evaluation target values are achieved by the measured values, causing, if the evaluation target values are achieved, the processor to output the predicted values as the settings for the conditions, and causing, if the evaluation target values are not achieved, the processor to optimize the additive manufacturing conditions by adding the predicted values and the measured values to the settings for the conditions and to the molding result and thus updating the predictive model, wherein the reference sample has at least three smooth surfaces and a surface having aggregated punched holes formed by straight lines and curved lines that are involved in three types of regions to be set as the conditions, namely, a fill region of a molding region, a region for forming an overhang, and a region for forming an outermost surface in a direction of molding height, and slice data of the reference sample has at least two independent regions in a layer at a center in a lamination direction, and includes a small region and a large region, the small region having a width of 1 mm or less and being cut off from an outer edge of the reference sample, the large region being formed by a portion other than the small region.

* * * * *